Oct. 11, 1960 W. R. WOOD 2,956,187
NESTED FLEXIBLE COUPLING FOR DYNAMOELECTRIC MACHINES
Filed June 10, 1955

Inventor:
Winchester R. Wood,
by
His Attorney.

United States Patent Office 2,956,187
Patented Oct. 11, 1960

2,956,187

NESTED FLEXIBLE COUPLING FOR DYNAMOELECTRIC MACHINES

Winchester R. Wood, Schenectady, N.Y., assignor to General Electric Company, a corporation of New York Filed June 10, 1955, Ser. No. 514,678

2 Claims. (Cl. 310—75)

This invention relates to a nested flexible coupling and, more particularly, to a coupling between an exciter and generator requiring a minimum of axial space while compensating for slight misalignment of the generator and exciter shafts.

In many applications, the space requirements for small synchronous generators are severely limited axially. In the past, exciters have been designed with no bearings, with the exciter armatures being quill-mounted on an extension of the generator shaft. This arrangement requires an expensive specially designed exciter for each synchronous generator that cannot easily be separately tested even though the electrical characteristics of the various exciters may be identical for several synchronous generators. Also, this results in an unduly large air gap in the exciter to prevent any vibrations or misalignment from damaging the exciter by making high-speed mechanical contacts between the moving and stationary parts of the exciter. In order to meet the overall length requirements when using a separate exciter having its own bearings, the problem becomes one of obtaining a satisfactory flexible coupling which consumes as near zero axial length on the machine as is possible.

Therefore, an object of my invention is to provide a simple resilient coupling for connecting two rotatable members journaled within separate frames which are rigidly connected.

In carrying out my invention in one form, I provide a generator having a shaft, one end of which is provided with a reentrant cylindrical opening to permit the entrance of the exciter shaft extension. A three-element nested flexible coupling joins the exciter shaft extension to the recess of the generator shaft with a minimum of axial length being utilized.

Further objects and advantages of my invention will become apparent and my invention will be better understood from the accompanying description referring to the accompanying drawings. The features of novelty which characterize my invention will be pointed out with particularity in the claims annexed to and forming part of the specification.

Figure 1:
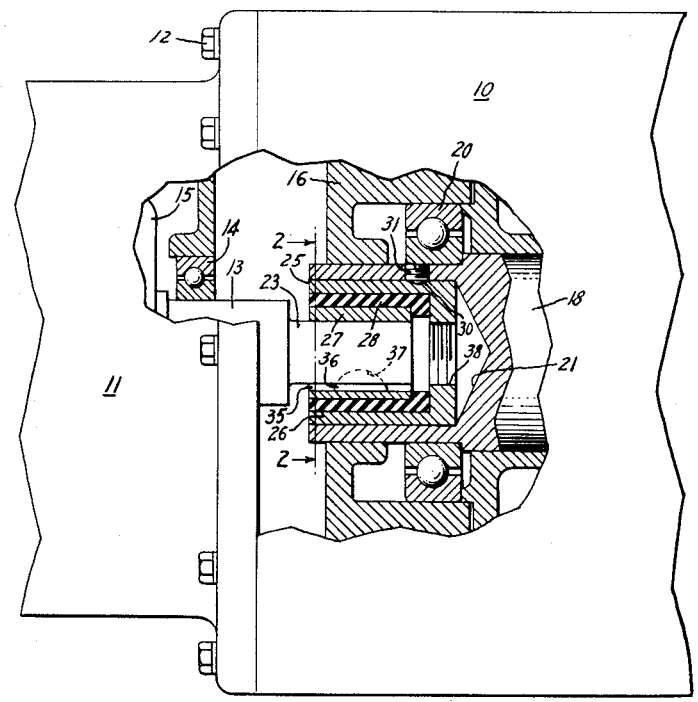
Figure 1 is a side plan view partially broken away of one embodiment of my invention, showing a generator and exciter connected by the nested coupling.

Referring to the drawing, I have shown in Figure 1 a generator frame 10 connected to an exciter frame 11 by means of bolts 12. Within the exciter frame 11, a shaft 13 is mounted on high-speed anti-frictional bearings 14 to rotatably support a rotor 15.

The cutaway portion of the generator frame 10 shows an end plate 16 which is non-rotatably secured to the frame 10. A generator shaft 18 is rotatably connected to the end plate 16 by high-speed anti-frictional bearings 20. In order to drive the exciter shaft 13 with a minimum of overall axial length, the end of the generator shaft 18 nearest the exciter frame 11 is provided with an axially drilled-out portion or recess 21 to accommodate an extension 23 of the exciter shaft 13.

In accordance with my invention, I prefer that the frames 10 and 11 be accurately aligned and be connected by the bolts 12 so that the shaft 18 and the shaft 13 are accurately axially aligned. However, because of machining tolerance inaccuracies, there will sometimes be a misalignment of several thousandths of an inch between the axial centerlines of these two shafts. Also the shafts may be connected with the centerline of the shaft 13 tilted one or more degrees with respect to the centerline of the shaft 18. Obviously, with a rigid connection between these journaled shafts and with such a slight misalignment, the resulting vibration at high speeds would destroy the lighter bearings 14 of the exciter and probably damage the bearings 20 of the generator. This would result in costly maintenance expenses. On the other hand, a rigid connection between the exciter and the shaft 18, with the shaft 13 being mounted without rigid journals or quill-mounted, would make it necessary to provide a greater air gap in the flux path of the rotor 15 to allow relative motion between the rotor 15 and the exciter pole pieces (not shown) which are secured to the exciter frame 11, thus allowing for any misalignment. Such a construction would, of course, be more expensive and require more electrical power to overcome the greater magnetic losses of the greater air gap of such an exciter.

In order to overcome these vibrational difficulties and still use anti-frictional bearings 14 and 20 to mount the shafts 13 and 18 respectively, my nested coupling 25 is telescoped within the recess 21 and connects the shaft extension 23 to be driven by the shaft 18, without requiring additional axial space.

Figure 2:
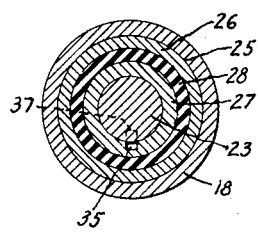
Figure 2 is a sectional view of the nested coupling taken along the line 2—2 of Figure 1.

Referring to Figure 2, I have shown one form of the nested coupling 25 as having an outer annular cup-shaped sleeve 26 and an inner annular sleeve 27 with a molded rubber sleeve connection 28 adapted to occupy an annular space therebetween, as shown in Figure 1. In order to transmit substantial torsion loads, the outer cup-shaped sleeve 26 may be connected to the inner surface of the recess 21 in the shaft 18 by a press fit, keying, or a set screw, or by any combination of these methods. In Figure 1, I have shown the cup-shaped member 26 being provided with a recess 30 to accommodate the set screw 31. I prefer that the annular sleeves 26 and 27 be of steel and that the resilient sleeve 28 be of oil-resistant rubber.

In using a resilient nested sleeve, the torque transmitted is often limited by the adhesion between the resilient and metal sleeves. In order for the molded rubber sleeve 28 to transmit the torque necessary to drive the exciter shaft 13 when the generator is initially started under load, I prefer that the inner surface of the outer sleeve 26 and the outer surface of the sleeve 27 be very clean to effect a strong bond between these sleeve surfaces and the resilient sleeve 28 when the assembly is molded. In some applications, it may be necessary to roughen the inner sleeve 27, depending on the greater area of the outer sleeve 26 to create enough friction. This is, of course, practicable where there is a disparity greater than 2 to 1 in the metal surface areas contacted by the resilient sleeve 28. Certain plating and other surface bonding preparations may be necessary depending on the materials used.

In order to secure the inner sleeve 27 to the extension 23 so that it will not rotate with respect thereto, I prefer a press fit, keying, and in some applications a set screw, or it may be done by any combination of these methods. I have shown the inner sleeve 27 as having a keyway 35 to accommodate the key 36, which extends into a slot 37 provided in the shaft extension 23.

When the cup-shaped sleeve 26 is secured to the shaft 18 by a press fit, it is necessary to jack the nested coupling 25 therefrom when it is desired to change or examine the nested coupling 25 for any reason. To accomplish this, I have provided a tapped hole 38 in the end of the cup-shaped sleeve 26. A bolt or screw (not shown) having the proper thread may be threaded into this hole 38 and then the entire assembly may be end-jacked from the recess 21 of the shaft 18.

Figure 3:
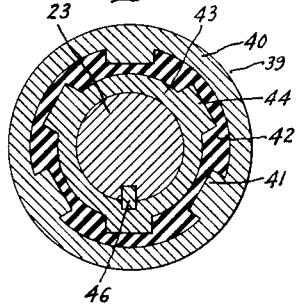
Figure 3 is a sectional end view of another embodiment of the nested coupling of my invention.

In Figure 3, I have shown a flexible nested coupling 39 which is a modification of the flexible nested coupling 25 shown in Figure 2, wherein an outer sleeve 40 is provided with detents 41 which extend radially into a resilient sleeve 42 and prevent slippage thereof. Similarly, an inner sleeve 43 is provided with detents 44 which extend outwardly into the resilient member 42 to prevent slippage therebetween. I prefer that the smooth coupling shown in Figure 2 be used on low speed machines while the coupling shown in Figure 3 may be used in machines run at a high speed. It should be noted that this construction puts the resilient sleeve 42 under compression between the inner and outer detents. The exciter shaft extension 23 may be secured to the sleeve 43 by a key 46 which prevents relative rotation. This nested coupling 39 will carry torsional loads as great or greater than the nested coupling 25 shown in Figures 1 and 2.

In some emergency operations it may be necessary to transmit torsional loads that will destroy the resilient sleeves. Thus, it should be noted that the detents 44 on the inner sleeve 43 extend radially into the molded resilient sleeve 42 to a radius smaller than that of the extremities of the detents 41 of the outer sleeve 40. In event that the molded member 42 is destroyed, the generator having the nested coupling 39 may be operated temporarily under emergency conditions for some time after the sleeve 42 has been destroyed. This safety feature construction may be necessary with the use of larger and heavier exciters or special or strategic applications but should not be necessary for relatively light exciters, where the torsional forces involved will not shear the rubber sleeve or destroy the bond between the resilient member and the inner sleeve or between the resilient member and the cup-shaped sleeve of my device.

Figure 4:
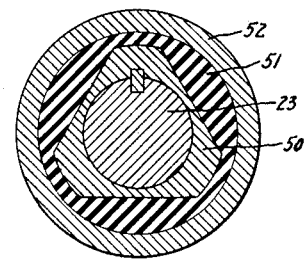
Figure 4 is a sectional end view of still another embodiment of my invention.

In other applications of this nested coupling where it is not desired to rely on the rubber to metal bond or where there is a probability that the rubber will tear or be otherwise destroyed by high speed vibrations even if the bond is not destroyed, it may be desirable to place the rubber sleeve under compression, thus reducing the liklihood of failure of the rubber sleeve. In order to accomplish this while providing a resilient nested sleeve, I prefer to make the inner sleeve 50 with an equilateral flat sided cross section at its outer surface such as the triangle shown in Figure 4. When the outer sleeve 52 is torsionally loaded the rubber sleeve 51 is prevented initially from slipping by the molding bond between the rubber sleeve 51 and the outer sleeve 52. As soon as torque is being transmitted to the inner sleeve 50 the flat sides of the triangular shape of the outer surface of the inner sleeve 50 compress the resilient sleeve 51 as well as creating shear stress therein. This compression tends to prevent tearing of the rubber or breaking of the bond between the resilient sleeve 50 and outer sleeve 52.

Referring again to Figures 2, 3 and 4, the inside diameter of the cup-shaped sleeves 26, 40 and 52 should always be concentric with the outside surfaces of the inner sleeves 27, 43 and 50 to provide a uniform thickness in the resilient sleeves 28, 42 and 51. This may be obtained by careful positioning during the molding process. Similarly, the outside diameter of the outer cup-shaped sleeves 26, 40 and 52 should always be concentric with the inside diameter of the inner sleeves 27, 43 and 50. This concentricity may be obtained by careful preparation of the sleeves prior to molding or by grinding or other machining of the outside member following the molding, by boring or grinding the inside member following the molding, or by any combination of these methods.

In summary, I have shown and described an exciter connected to a generator by a nested coupling within the recess 21 of the shaft 18 of the generator which requires no additional axial space. This nested coupling allows vibration between the exciter and generator shafts sufficient to compensate for any axial misalignment between these shafts, thus preventing damage of the anti-frictional bearings 14 and 20 of the exciter and generator respectively.

While I have illustrated and described particular embodiments of my invention, modifications thereof will occur to those skilled in the art. I desire it to be understood, therefore, that my invention is not limited to the particular arrangements disclosed, and I intend by the appended claims to cover all such modifications which do not depart from the true spirit and scope of my invention.

What I claim as new and desire to secure by Letters Patent of the United States is:

1. In combination a synchronous generator having a frame and a solid rotor shaft mounted on anti-frictional bearings, an exciter having a frame and a solid rotor shaft mounted on anti-frictional bearings and adapted to be driven by said generator shaft, said generator shaft being provided with an axial recess at one end within the housing of said generator, a portion of said recess being within the cross sectional volume of said generator shaft defined by the surface of the bearing support area nearest to said one end, said exciter shaft being provided with an axial extension at one end, means for rigidly securing said exciter frame to said generator frame in substantial alignment so that said extension lies within said recess, a first sleeve secured within said recess, a second sleeve secured on said extension and lying substantially coaxially within said first sleeve so that at least a portion of said second sleeve extends into said recess in that portion of said recess that is within the cross sectional volume of the generator shaft defined by the surface of the generator bearing support area, and a resilient sleeve connecting said first sleeve and said second sleeve to form a nested coupling within said recess for drivingly connecting said exciter shaft to said generator shaft whereby any vibrations resulting from slight misalignments will not damage said bearings supporting said shafts.

2. A flexible coupling requiring substantially no axial length and being suitable for connecting the ends of two high speed rotatable shafts of dynamoelectric machines subject to misalignment considerations which are journaled within rigidly connectable frames of two machines subject to overall length limitations with each of the shafts subject to accurate alignment considerations within its respective frame comprising, an axial extension on one of the two shafts extending beyond the frame of a first of the machines, the other of the shafts being provided with an axial recess within the frame of the second machine, the recess being of a depth and breadth suitable for accommodating the extension to provide a telescope type coupling within the second machine when the two frames are rigidly connected, anti-frictional bearings within each of the frames for maintaining the respective shafts in axial alignment therein, a first sleeve secured within the recess, a second sleeve secured on the extension, and a resilient sleeve drivably connecting the first and second sleeves with a resiliency sufficient to accommodate slight radial or angular misalignment between the two shafts for preventing vibrations from damaging the bearings.

References Cited in the file of this patent

UNITED STATES PATENTS

| | | |
|---|---|---|
| 1,688,891 | Spreen | Oct. 23, 1928 |
| 1,906,057 | Guy | Apr. 25, 1933 |
| 2,174,223 | Frauenthal et al. | Sept. 26, 1939 |
| 2,189,598 | Brecht | Feb. 6, 1940 |
| 2,262,512 | Musselman | Nov. 11, 1941 |
| 2,272,900 | Saurer | Feb. 10, 1942 |
| 2,560,644 | Hartzell | July 17, 1951 |
| 2,676,279 | Wilson | Apr. 20, 1954 |
| 2,827,229 | Blum | Mar. 18, 1958 |

FOREIGN PATENTS

| | | |
|---|---|---|
| 604,753 | Great Britain | July 9, 1948 |